United States Patent [19]

Sakamoto

[11] Patent Number: 4,953,033
[45] Date of Patent: Aug. 28, 1990

[54] IMAGE FORMING APPARATUS FOR FORMING IMAGES BY USE OF FONTS

[75] Inventor: Yumi Sakamoto, Ebina, Japan

[73] Assignee: Ricoh Company, Ltd., Tokyo, Japan

[21] Appl. No.: 204,049

[22] Filed: Jun. 8, 1988

[30] Foreign Application Priority Data

Jun. 19, 1987 [JP] Japan .................................. 62-151289

[51] Int. Cl.⁵ ........................ H04N 1/29; G01D 15/14
[52] U.S. Cl. ...................................... 358/300; 346/160
[58] Field of Search ....................... 358/296, 300, 302; 346/108, 160, 153.1, 107 R

[56] References Cited

U.S. PATENT DOCUMENTS 4,707,709 11/1987 Tsilibes ................................ 346/108

Primary Examiner—Bruce A. Reynolds
Assistant Examiner—Scott A. Rogers
Attorney, Agent, or Firm—Cooper & Dunham

[57] ABSTRACT

An image forming apparatus forms an image of an input image information by use of a font, and comprises a memory part for storing data on bit map fonts and outline fonts, a setting part for setting a minimum size of an outline font which may be used, a first selecting part for selecting a desired kind of font, a second selecting part for selecting a size of the desired kind of font selected by the first selecting part, and an image forming part for forming the image of the input image information by use of the desired kind and size of font selected by the first and second selecting parts based on corresponding data read out from the memory part.

9 Claims, 6 Drawing Sheets

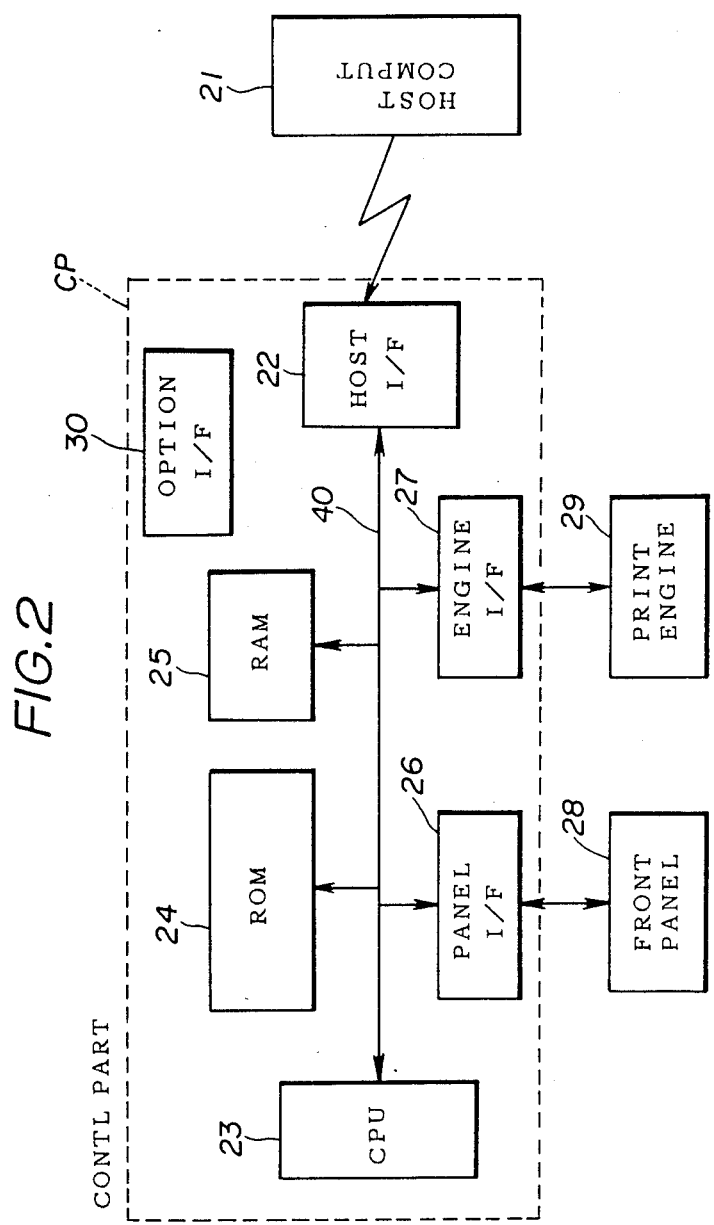

IMAGE FORMING APPARATUS FOR FORMING IMAGES BY USE OF FONTS

BACKGROUND OF THE INVENTION

The present invention generally relates to image forming apparatuses, and more particularly to an image forming apparatus such as a laser printer which uses character fonts.

Generally, when forming an image on an image forming apparatus such as a laser printer, the laser printer may use a bit map font or an outline font. When printing on the printer which uses the bit map font an enlarged character having a width of over one inch, for example, the quality of the printed character is unsatisfactory in that the height and width of each dot are enlarged thereby making the contour of the character uneven.

On the other hand, the printer which uses the outline font determines the position of the character curve by a function, and prints the dot at a position closest to the curve for each line on the paper. For this reason, the error in the dot position becomes conspicuous as the size of the character becomes smaller. Generally, the quality of the printed character is poor for the character with the outline font of under eight points (1 inch=72 points).

Therefore, in the case of the bit map font, there is a problem in that the quality of the printed character becomes poor when the size of the character is greater than a predetermined size due to the uneven contour of the character. But in the case of the outline font, there is a problem in that the quality of the printed character becomes poor when the size of the character is smaller than a predetermined size.

SUMMARY OF THE INVENTION

Accordingly, it is a general object of the present invention to provide a novel and useful image forming apparatus in which the problems described heretofore are eliminated.

Another and more specific object of the present invention is to provide an image forming apparatus which selectively uses the outline font and the bit map font. According to the image forming apparatus of the present invention, it is possible to form a character of a high quality because the outline font makes up for the drawbacks of the bit map font and vice versa.

Still another object of the present invention is to provide an image forming apparatus having both a bit map font and an outline font and comprising setting means for setting a minimum size of the outline font which can be used, means for selecting a desired kind of font, and means for selecting a size of the desired font. According to the image forming apparatus of the present invention, it is possible to carry out a printing of a high quality.

A further object of the present invention is to provide an image forming apparatus which forms an image of an input image information by use of a font and comprises memory means for storing data on bit map fonts and outline fonts, setting means for setting a minimum size of an outline font which may be used, first selecting means for selecting a desired kind of font, second selecting means for selecting a size of the desired kind of font selected by the first selecting means, and image forming means for forming the image of the input image information by use of the desired kind and size of font selected by the first and second selecting means based on corresponding data read out from the memory means.

Other objects and further features of the present invention will be apparent from the following detailed description when read in conjunction with the accompanying drawings.

BRIEF DESCRIPTION OF THE DRAWINGS

FIG. 2 is a system block diagram showing an embodiment of a control part of the embodiment shown in FIG. 1;

DETAILED DESCRIPTION

Figure 1:
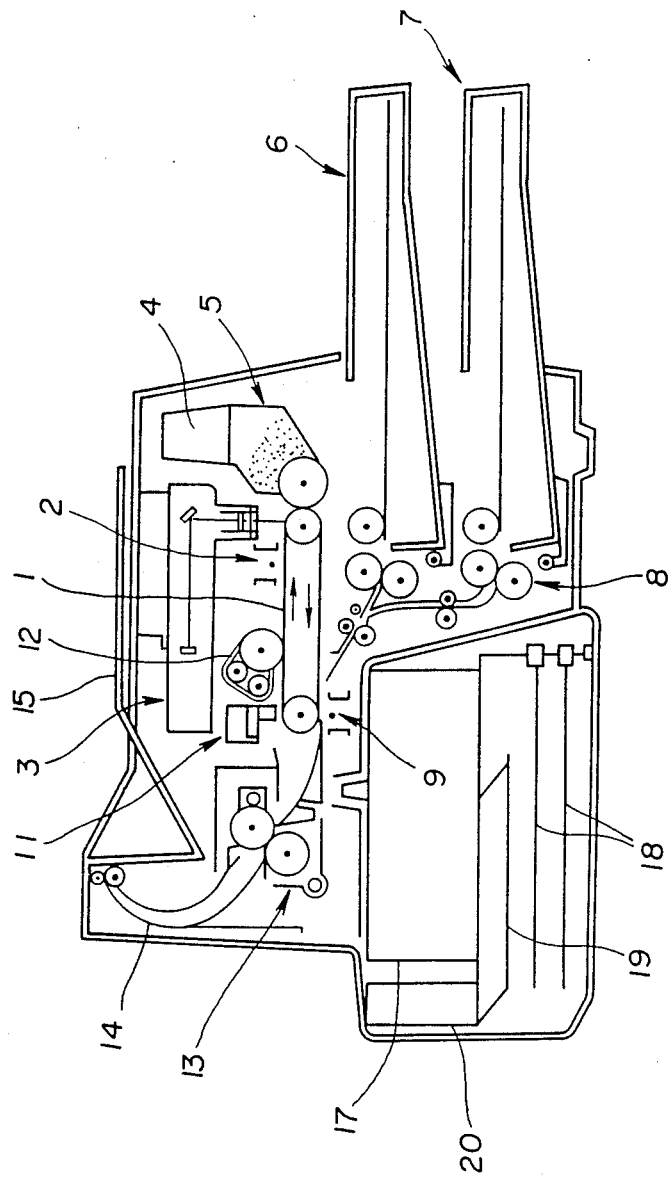
FIG. 1 is a cross sectional view generally showing an embodiment of the image forming apparatus according to the present invention.

FIG. 1 generally shows an embodiment of the image forming apparatus according to the present invention. In the present embodiment, the image forming apparatus is a laser printer.

In FIG. 1, a photosensitive belt 1 is transported in a direction of an arrow responsive to a print start instruction, and a charger part 2 uniformly charges a surface of the photosensitive belt 1. Then, a write part 3 emits a laser beam dependent on an object image to be written onto the photosensitive belt 1 to form thereon an electrostatic image in accordance with the object image. A developing part 5 provided with a toner cartridge 4 adheres the toner on the electrostatic image formed on the photosensitive belt 1, thereby forming a toner image on the photosensitive belt 1.

Next, a paper feeder 8 feeds a recording sheet (paper) accommodated in an upper paper tray 6 or a lower paper tray 7 with a predetermined timing. A transfer charger 9 is driven with a predetermined timing to transfer the toner image on the photosensitive belt 1 onto the fed recording sheet.

Thereafter, a discharger part 11 eliminates the charge remaining on the photosensitive belt 1, and a cleaning part 12 cleans the photosensitive belt 1 by removing the residual toner on the photosensitive belt 1. Hence, the laser printer is ready to print another object image.

On the other hand, the recording sheet transferred with the toner image is separated from the surface of the photosensitive belt 1. The separated recording sheet is supplied to a fixing part 13 where the recording sheet is subjected to a thermal fixing process. Then, the recording sheet from the fixing part 13 is ejected onto an ejecting tray 15 by way of an ejecting part 14.

The laser printer also has in a lower portion thereof a power source 17 for the main body and a control part of the laser printer, a printed circuit board 18 comprising the control part, a printed circuit board 19 comprising an engine driver, and a fan 20.

FIG. 2 shows an embodiment of the control part of the laser printer shown in FIG. 1. A control part CP comprises a host computer 21, a host interface 22 for entering a code signal supplied from the host computer 21, a central processing unit (CPU) 23, a read only memory (ROM) 24, a random access memory (RAM) 25, a panel interface 26, and an engine interface 26. An option interface 30 is provided according to the needs. A personal computer, a word processor, a data processor, a work station, an image editing and processing apparatus and the like may be used for the host computer 21. A front panel 28 is coupled to the control part CP through the panel interface 26, and a print engine 29 is coupled to the control part CP through the engine interface 27.

Next, a description will be given on the functions of the elements constituting the control part CP shown in FIG. 2.

The host interface 22 enters character data and other data transferred from the host computer 21 or instructions on the point, pitch, type face and the like freely transferred from the host computer 21 in a command format. The data or instruction entered by the host interface 22 is outputted to various parts of the control part CP through a bus 40.

According to the instruction from the host computer 21 and a program stored in the ROM 24, the CPU 23 carries out function calculation of the control part CP on the outline font related to the character data and all other operation and control processing of the control part CP.

The ROM 24 stores programs for carrying out the operation and control in the CPU 23, and also stores data on bit map fonts and the outline fonts. The data on the fonts stored in the ROM 24 are related to the bit map fonts of eight points or under and the outline fonts of nine points or over.

The RAM 25 receives the character data or other data transferred from the host computer 21 through the host interface 22, and outputs the data responsive to an instruction from the CPU 23.

The panel interface 26 transmits and receives panel data between the front panel 28 of the laser printer and the control part CP of the laser printer.

The engine interface 27 transfers to the print engine 29 a print instruction from the host computer 21, character data on operation and control results obtained from the CPU 23 and the like.

The front panel 28 is at least provided with a plurality of switches (not shown) for making a font selection. The switches select certain kinds of fonts or font names such as "A", "B" and "C". The point, pitch and the like of the font names "A", "B" and "C" are prestored in the ROM 24.

In a case where the font name "A" is selected, a dot pattern is determined by use of the outline font in accordance with the data on the front name "A" stored in the ROM 24. The dot pattern is converted into a dot pattern having a format of the bit map font and is stored in the RAM 25. Thereafter, the CPU 23 obtains the data on the font name "A" not from the ROM 24 but from the RAM 25. That is, once the dot pattern in the format of the bit map font is stored in the RAM 25, the CPU 23 no longer obtains the data on the outline font of the font name "A" from the ROM 24.

The CPU 23 also displays an error message and the like.

In response to the print instruction from the host computer 21 received through the engine interface 27, the print engine 29 prints the character data in accordance with the operation and control carried out in the CPU 23.

Next, before describing the detailed function and operation of the present embodiment, a description will be given on the differences between the forming of the character using the bit map font and the outline font by referring to FIGS. 3A, 3B, 4A and 4B, so as to facilitate the understanding of the embodiment.

It will be assumed for convenience' sake that the laser printer carries out the printing with 300 dots per inch (dpi), and in FIGS. 3A through 4B, a square with sides of 24 centipoints corresponds to one dot. Furthermore, it will be assumed that a sine curve is printed.

Figure 3A:
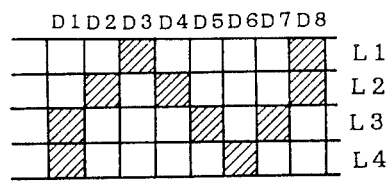
FIGS. 3A and 3B are diagrams for explaining the bit map font and problems thereof.
Figure 3B:
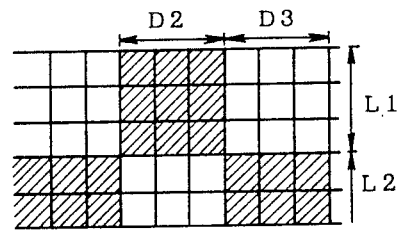
Figure 4A:
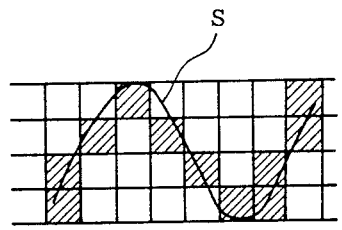
FIGS. 4A and 4B are diagrams for explaining the outline font and problems thereof.
Figure 4B:
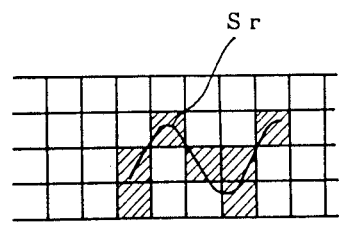

The bit map font has data on whether each dot from the left end is black or white for each line. At a first line L1 shown in FIG. 3A, a first dot D1 is white, a second dot D2 is white, a third dot D3 is black, a fourth dot D4 is white, and so on. At a fourth line L4, a sixth dot D6 is black, a seventh dot D7 is white, an eighth dot D8 is white, and so on. When the sine curve of FIG. 3A is enlarged to three times, each position corresponding to one dot in FIG. 3A is described in 3×3 dots as shown in FIG. 3B. For this reason, the contour of the curve (or character) becomes quite uneven and the quality of the printing is poor.

On the other hand, the outline font determines the design (or pattern) of the character by a combination of predetermined functions. When printing a sine curve S indicated by a solid line in FIG. 4A, the black dots are selected as shown depending on the curve so as to closely resemble the sine curve S. But when the sine curve S is reduced to a sine curve Sr indicated by a solid line in FIG. 4B, it no longer becomes possible to select the black dots so as to closely resemble the since curve Sr. As a result, the printed curve (or character) does not closely resemble the curve (or character) to be printed and the quality of the printing is poor. Generally, such a deterioration in the quality of the printing becomes conspicuous with respect to characters of eight points (1 inch=72 points) or less. For this reason, the minimum size of the outline font is selected to nine points in the present embodiment as will be described hereunder.

Figure 5:
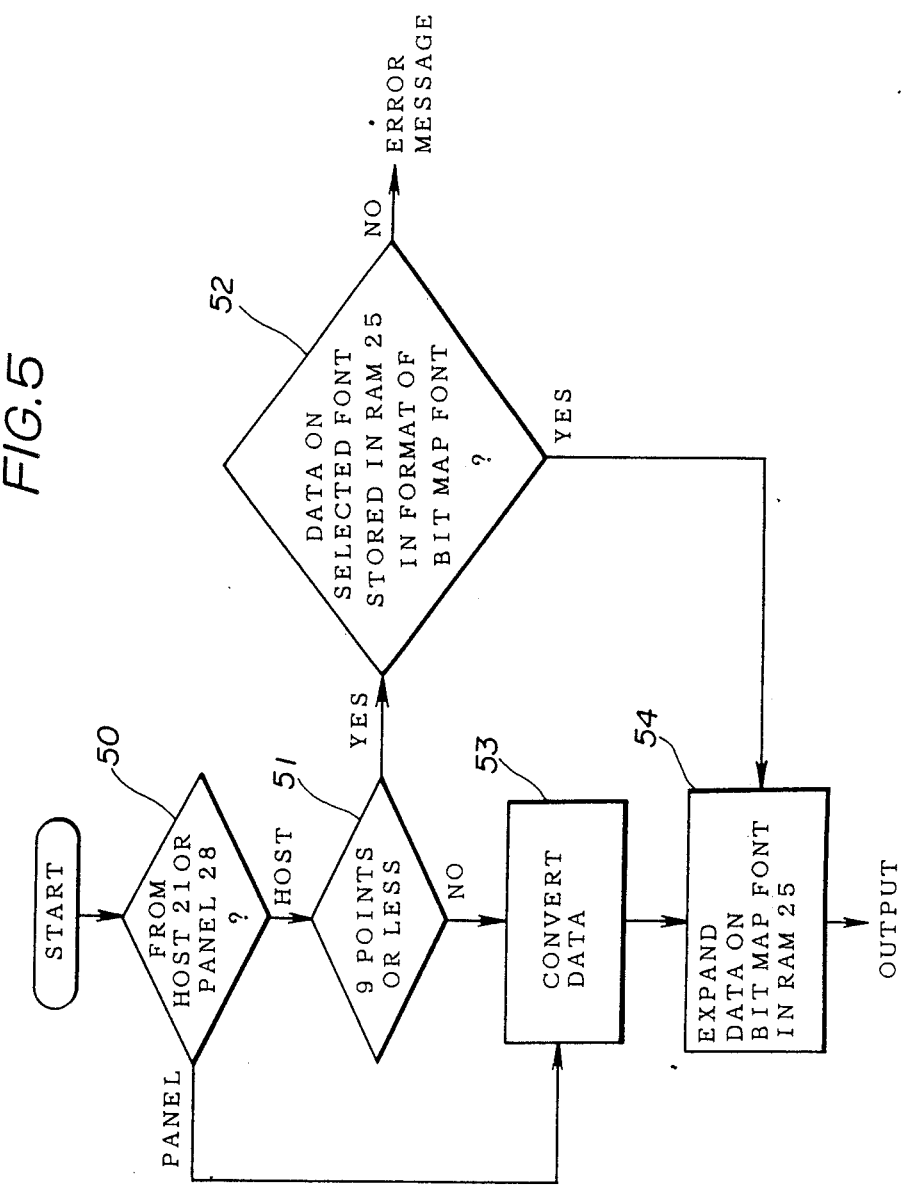
FIG. 5 is a flow chart for explaining an operation of a central processing unit of the control part for converting the format of the outline font into that of the bit map font.

FIG. 5 is a flow chart for explaining an operation of the CPU 23 for converting-the format of the outline font into that of the bit map font. A step 50 discriminates whether a first start instruction is received from the host computer 21 or the front panel 28. When the first start instruction is received from the host computer 21, a step 51 discriminates whether or not the size of the character is nine points or less. When the size of the character is nine points or less and the discrimination result in the step 51 is YES, a step 52 discriminates whether or not a data on a font identical to the selected font is stored in the ROM 24 in the format of the bit map font. When the discrimination result in the step 52 is NO, an error message is displayed. But when the discrimination result in the step 52 is YES, a step 54 expands and stores the data on the bit map font in the RAM 25.

On the other hand, when the discrimination result in the step 51 is NO, a step 53 converts the data of the character into a data having a format of the bit map font and is stored in the RAM 25 in the next step 54.

In the case where the first start instruction is received from the front panel 28, the step 53 converts the data of the character into the data having the format of the bit map font and is stored in the RAM 25 in the next step 54.

The data stored in the RAM 25 can be outputted in a subsequent step (not shown).

Figure 6:
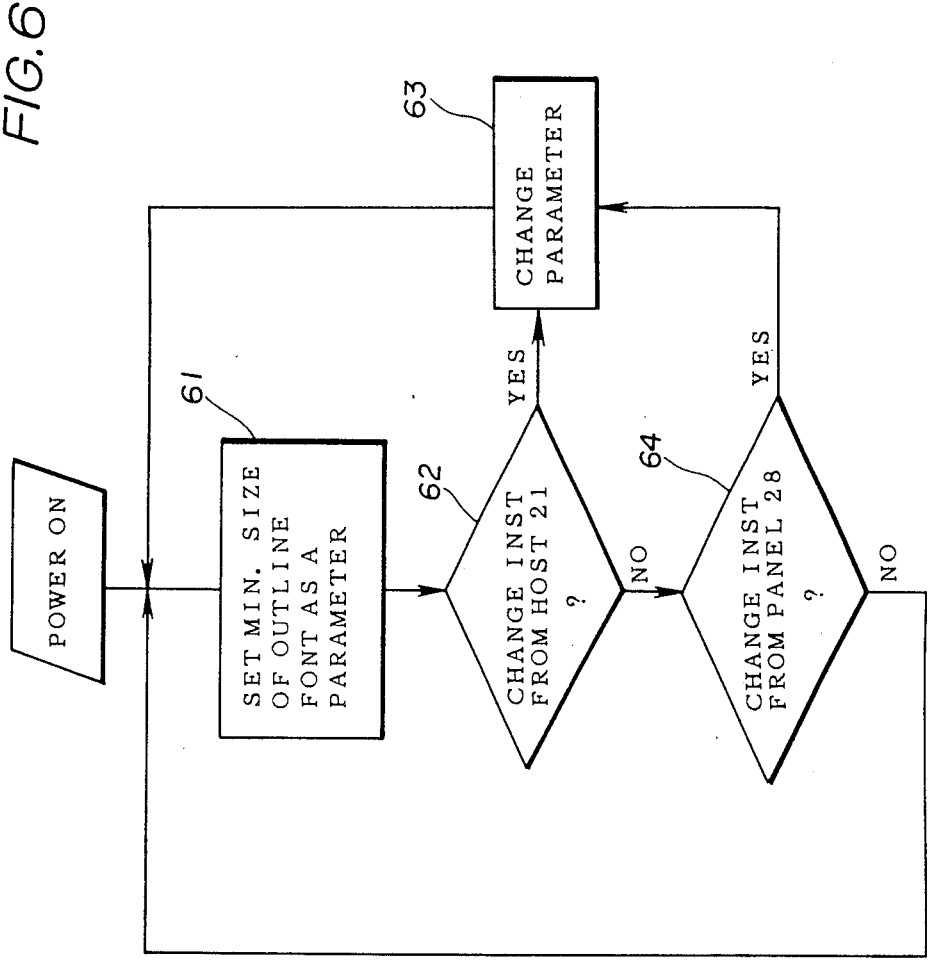
FIG. 6 is a flow chart for explaining setting means for setting a minimum size of outline font which can be used.

FIG. 6 is a flow chart for explaining setting means constituted by the CPU 23 for setting a minimum size of outline font which can be used. When the power source 17 is turned ON, a step 61 sets a minimum size of the outline font as a parameter depending on the attribute of the font. A step 62 discriminates whether or not an instruction to change the minimum size of the outline font used is received from the host computer 21. When the discrimination result in the step 62 is YES, a step 63 changes the parameter in accordance with the instruction and the process returns to the step 61. On the other hand, when the discrimination result in the step 62 is NO, a step 64 discriminates whether or not the instruction to change the minimum size of the outline font used is received from the front panel 28. The process returns to the step 61 when the discrimination result in the step 64 is NO. But when the discrimination result in the step 64 is YES, the step 63 changes the parameter in accordance with the instruction before returning the process to the step 61.

Figure 7:
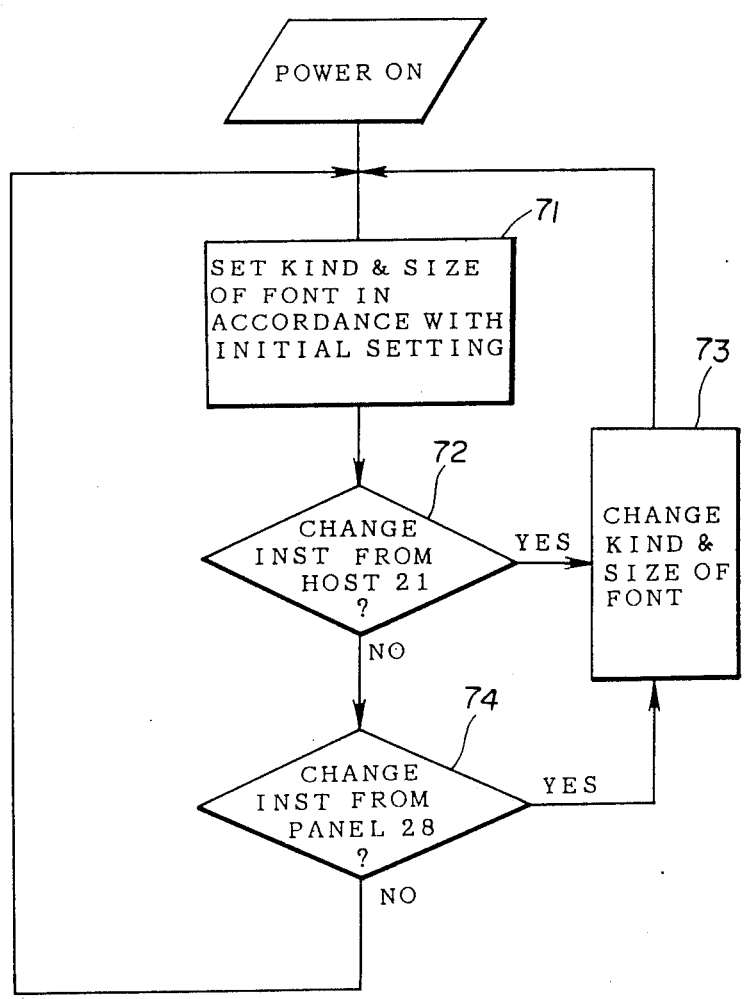
FIG. 7 is a flow chart for explaining selecting means for selecting kind and size of a desired font.

FIG. 7 is a flow chart for explaining selecting means constituted by the CPU 23 for selecting kind and size of a desired font. When the power source 17 is turned ON, a step 71 sets the kind and size of the desired font in accordance with the initial setting of the laser printer. A step 72 discriminates whether or not an instruction to change the kind and size of the desired font is received from the host computer 21. When the discrimination result in the step 72 is YES, a step 73 changes the kind and size of the desired font in accordance with the instruction, and the process is returned to the step 71. On the other hand, when the discrimination result in the step 72 is NO, a step 74 discriminates whether or not the instruction to change the kind and size of the desired font is received from the front panel 28. The process returns to the step 71 when the discrimination result in the step 74 is NO. But when the discrimination result in the step 74 is YES, the step 73 changes the kind and size of the desired font in accordance with the instruction before returning the process to the step 71.

Therefore, the outline font is selected in the case of the character enlarged to nine points or more, and the bit map font is selected when printing a small character. As a result, it is possible to print both small and large characters with a satisfactory quality.

Normally, the outline font is used in most cases. In the present embodiment, because the data on the outline font is stored in the RAM 25 in the format of the bit map font, there is no need to make access to the ROM 24 every time the outline font is used, thereby effectively reducing the printing time by reducing the access time of the data on the outline font.

Further, the present invention is not limited to these embodiments, but various variations and modifications may be made without departing from the scope of the present invention.

What is claimed is:

1. An image forming apparatus for forming an image of an input image information by use of a font, said image forming apparatus comprising:
   memory means for storing data on bit map fonts and outline fonts;
   setting means for setting a minimum size of an outline font which may be used;
   first selecting means for selecting a desired kind of font;
   second selecting means for selecting a size of the desired kind of font selected by said first selecting means;
   image forming means for forming the image of the input image information by use of the desired kind and size of font selected by said first and second selecting means based on corresponding data read out from said memory means; and
   converting means for converting data on an outline font into a format of a bit map font,
   said memory means comprising first memory means for storing the data on the bit map fonts and the outline fonts and second memory means for storing a converted data obtained from said converting means,
   said image forming means making access to said second memory means when said first selecting means selects an outline font.

2. An image forming apparatus as claimed in claim 1 in which said first selecting means selects an outline font with respect to an input image information related to a character enlarged to a predetermined point value or over.

3. An image forming apparatus as claimed in claim 2 in which said predetermined point value is nine points.

4. An image forming apparatus as claimed in claim 2 in which said first selecting means selects a bit map font with respect to an input image information related to a character smaller than a predetermined size.

5. An image forming apparatus as claimed in claim 1 which further comprises changing means for changing a selection made by said first and second selecting means.

6. An image forming apparatus as claimed in claim 5 in which said first and second selecting means initially select predetermined kind and size of font.

7. An image forming apparatus as claimed in claim 5 in which said changing means includes a host computer coupled to said image forming apparatus.

8. An image forming apparatus as claimed in claim 5 which further comprises a front panel having switches for controlling said image forming apparatus, said changing means including said front panel.

9. An image forming apparatus as claimed in claim 1 in which said image forming means comprises means for forming the image of the input image information by electrophotography.

* * * * *